United States Patent [19]

Lo

[11] Patent Number: 4,932,052
[45] Date of Patent: Jun. 5, 1990

[54] SELF-ADJUSTING HEADSET-HANDSET COMBINATION

[76] Inventor: Jack Lo, 354 Ardendale Dr., Daly City, Calif. 94014

[21] Appl. No.: 449,400

[22] Filed: Dec. 13, 1989

Related U.S. Application Data

[63] Continuation-in-part of Ser. No. 371,390, Jun. 26, 1989, abandoned.

[51] Int. Cl.$^5$ .............................................. H04M 1/05
[52] U.S. Cl. ..................................... 379/430; 381/187
[58] Field of Search ...................... 381/183, 187, 68.6; 379/430, 433

[56] References Cited

U.S. PATENT DOCUMENTS

| | | | |
|---|---|---|---|
| D. 237,090 | 10/1975 | Yanagawa | 381/187 |
| 2,474,135 | 6/1949 | White | 381/187 |
| 3,280,273 | 10/1966 | Flygstad et al. | 379/430 |
| 3,610,841 | 10/1971 | Hutchings | 379/430 |
| 3,862,378 | 1/1975 | Norris | 379/430 |
| 4,273,969 | 6/1981 | Foley et al. | 379/430 |
| 4,335,281 | 6/1982 | Scott et al. | 379/430 |
| 4,453,050 | 6/1984 | Enokido | 381/187 |
| 4,529,058 | 7/1985 | Emery | 381/187 |
| 4,754,484 | 6/1988 | Larkin et al. | 379/430 |
| 4,821,318 | 4/1989 | Wu | 381/183 |

FOREIGN PATENT DOCUMENTS

| | | | |
|---|---|---|---|
| 103839 | 7/1926 | Austria | 381/187 |
| 244384 | 12/1925 | United Kingdom | 381/187 |
| 286185 | 3/1928 | United Kingdom | 381/187 |

OTHER PUBLICATIONS

Telex Announcer's Earset Technical Data 4037-4, May 1976.
Telex Earset Specification Sheet, Form #381006, Apr. 1950.

Primary Examiner—Jin F. Ng
Assistant Examiner—Danita R. Byrd
Attorney, Agent, or Firm—David Pressman

[57] ABSTRACT

A combined handset and headset comprises a cylindrical speaker housing (20) which fits into the pinna (46) and contains a speaker (38). The speaker housing has an upper extension (24) which in turn has an end housing or pinna clamping part (28) slidably mounted thereto. The slidable housing contains a crossbar (14) for resting against the rear side of the pinna. The slidable housing is spring urged to a compacted position against the pinna so that it can clamp the pinna between it and the speaker housing so that the unit will retain itself on the pinna. The slidable housing can be pulled back and locked in an extended position where the crossbar is far enough from the cylindrical housing that the crossbar will be clear of the pinna so that the set can be used as a handset. The pinna clamping part can be locked in its extended position and urged to its compacted position by means of a trough (42) with a curved bottom (48, 50o, 50i) which acts as a cam positioner, in cooperation with a spring-loaded roller (58). Alternatively the extended lock and clamping spring can comprise (a) a bowed leaf spring (84) on the slidable part over which rides a fixed roller (86) which is attached to the main body, or (b) a tension spring (98) or compression (112) spring and a flat cantilevered feeler spring (106) with an end pawl (108) and mating notch (110).

26 Claims, 9 Drawing Sheets

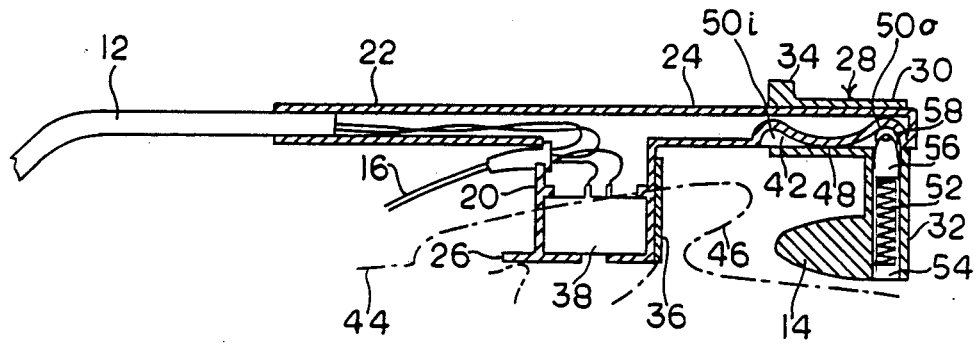
FIG IC
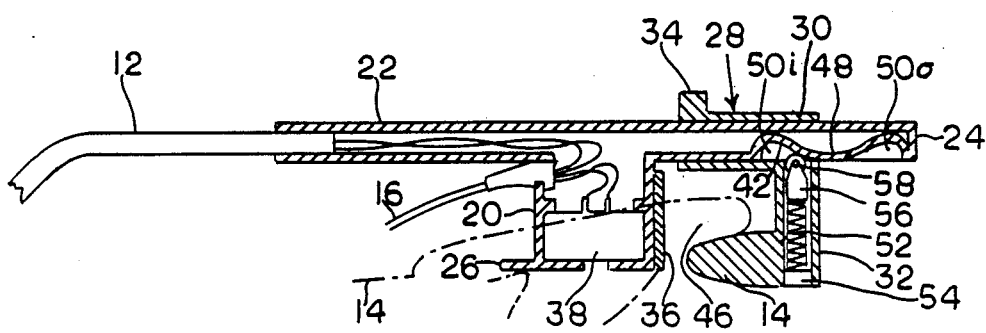
FIG ID

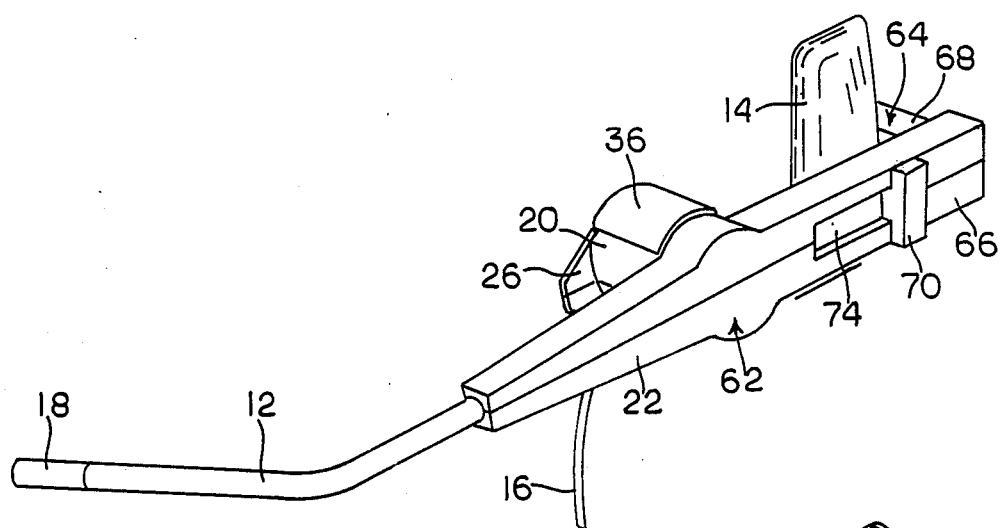
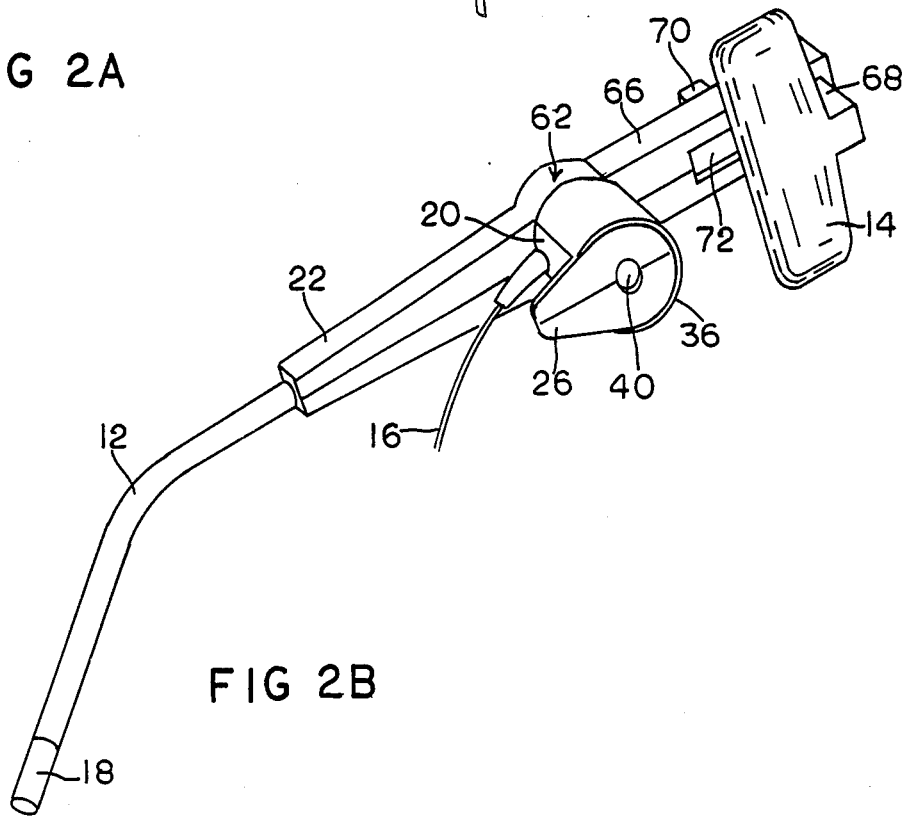

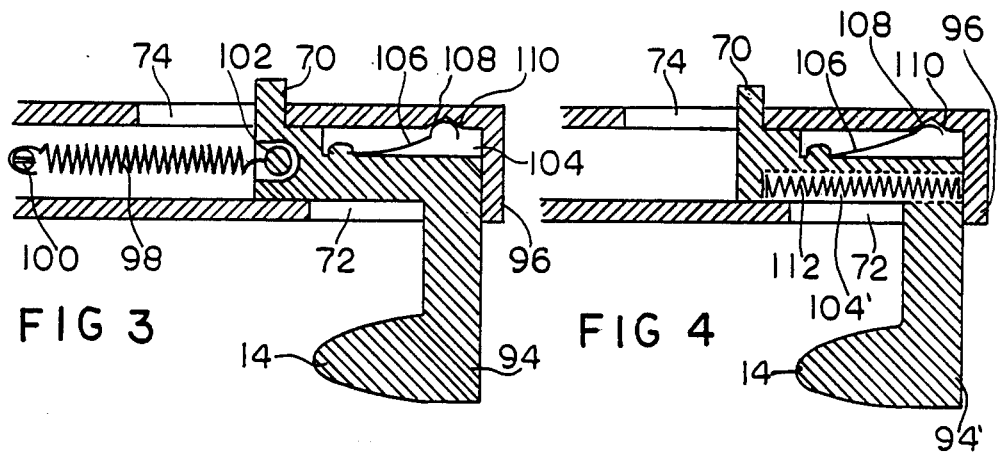

SELF-ADJUSTING HEADSET-HANDSET COMBINATION

This application is a continuation-in-part of application Ser. No. 371,390, filed Jun. 26, 1989, now abandoned.

BACKGROUND

1. Field of Invention:

This invention relates generally to telephony, specifically to a combined handset and headset for a telephone.

2. Description of Prior Art:

In the 1930s telephone sets of the "candlestick" variety were widely used. They comprised an elongated, upright housing with a dial at the bottom and a funnel-like microphone at the top, together with a separate earpiece which contained a speaker. The earpiece, the upright housing, and a wall-mounted control box were connected by wires. Users found this set awkward because they usually had to hold (a) the microphone housing in one hand so that its microphone was close to the mouth, and (b) the earpiece against the ear with the other hand. Users could leave the microphone housing on a desk or table, but in this case they had to bring their heads close to the microphone while holding the earpiece against an ear.

This type of telephone was replaced by one in common household use today. This set has a dial in one housing and the microphone and speaker at respective ends of another, elongated handheld housing, termed a handset. This type of telephone allowed the user to hold just one housing for speaking and listening—the handset—with one hand and still be able to move about with one hand free. Thus it was a great improvement on the former candlestick set. However it was not well suited for stockbrokers, telephone operators, receptionists, and other users who had to remain on the phone for long periods of time. This is because while users were speaking or listening on the line, they had to hold the handset so that its speaker was continuously against an ear and its microphone was continuously close to the mouth. As this tired users physically and left only one hand free for other tasks, they felt a need for a "hands-free" handset, or headset.

Several types of headsets thus came into use, but these had various disadvantages.

In one, the speaker was held to the head by an over-the-head clamp or band while the micrphone was connected to the speaker by an arm or boom which placed it in front of the user's mouth. While suitable for use as a headset, users found it awkward to hold the headset by hand, as they would want to do for intermittent use. This is because it took more effort to install on the head than was justified by a brief use. While it could be held in the user's hand and used like a handset, it was awkward and difficult to use in this manner because of its relatively complex shape, principally because its headband interfered with use.

Another type of headset is shown in U.S. Pat. Nos. 3,280,273 to Flygstad et al. (1966), 3,610,841 to Hutchings (1971), 4,335,281 to Scott et al. (1982), and 4,273,969 to Foley et al. (1981). These sets had housings which fit behind the auricle or pinna (external part of the ear) and a flexible eartube speaker which extended around and forward from the post-pinna housing, or back from a fore-pinna part of the housing, into the auditory canal. While these devices eliminated the need for a headband by clamping or holding the pinna between the housing and the eartube, they could not be used as a handset because their curved eartubes could not be placed in the ear canal unless the device were fully installed on the user's head. This involved putting the housing on the pinna and then inserting the flexible tube into the auditory canal, an awkward operation. In addition, for sanitary reasons, the eartube made the set suitable for use only by a single user. Finally, they had poor positional stability; this caused the location of the microphone to vary so that it was not always in front of the mouth. Designers solved this problem by providing an adjustable microphone boom, but the whole set was still unstable becuase it was held in place simply by gravity. Also the boom had to be adjusted frequently, depending on the current orientation of the set on the head. Omni-directional microphones could solve this problem somewhat, but they had poor signal-to-noise ratios since they picked up ambient noise.

U.S. Pat. No. 2,474,135 to White (1949) shows an earpiece (no microphone attached) which contains a speaker housing which is positioned adjacent the ear canal and a curved part which is hinged to the speaker housing so that it can be pivoted behind the ear to clamp the pinna between the curved part and the speaker. U.S. Pat. No. 3,862,378 to Norris (1975) made use of White's arrangement for headsets by extending a microphone boom from the speaker housing. However this headset could not conveniently be used as a handset because of interference from the curved part when the speaker housing was held against the ear. Also it was somewhat awkward to install on an ear because its curved parts had to be pivoted away from its speaker housings and then released or pivoted back. Further, Norris's device had a fixed spacing between its pivot and the speaker housing so that it was suitable for one size of pinna only; users with very large or very small pinnas could not wear the device comfortably or stably. Finally it was suitable for the ear on a predetermined side of the head only.

Enokido, in U.S. Pat. No. 4,453,050 (1984) showed an earphone which could be adjusted for varying pinna sizes, and could be used on either side of the head. However it had to be manually adjusted for the ear side and for the pinna size, the latter in a trial-and-error operation, which was awkward and time consuming.

OBJECTS AND ADVANTAGES

Accordingly, several objects and advantages of the invention are to provide a device which will serve as both a handset and headset, to provide a headset which can be used as a handset, which can be used as a handset in a convenient manner, which can be used on either the left or the right ear, which is relatively rugged, which can be used on either ear without requiring any adjustments, which is relatively stable on the ear, can be used by multiple users, can be used with highly directive microphones which have low background noise, high clarity, and good signal-to-noise ratio, can be easily installed on the ear, can be installed on pinnas of varying sizes, and automatically adjusts to the pinna size.

Further objects and advantages will become apparent from a consideration of the ensuing description and the accompanying drawings.

DRAWING FIGURES:

FIGS. 1C and 1D are partial sectional views of the set of FIG. 1A in handset and headset positions, respectively.

FIGS. 2A and 2B are isometric views of the outer and inner sides, respectively, of a combined set with a bowed-spring positioner according to another embodiment of the invention.

FIG. 3 is a partial view, in cross section, of a set with tension and feeler springs according to a third embodiment of the invention.

FIG. 4 ia a partial view, in cross section, of a set with compression and feeler springs according to a fourth embodiment of the invention.

Figure 5:
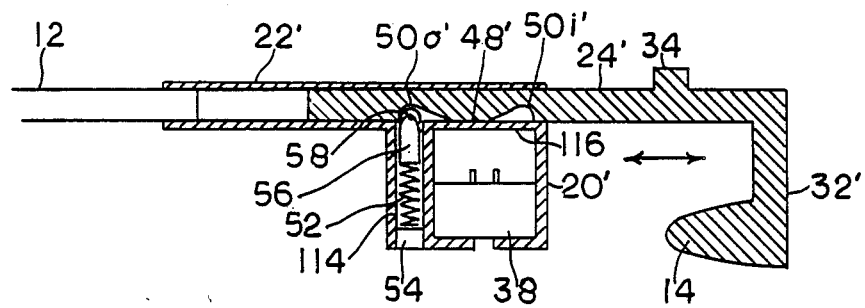

FIG. 5 is a partial view, in cross section, of a set with a moveable extension and crossbar according to a fifth embodiment of the invention.

DRAWING REFERENCE NUMERALS:

| 10 body | 12 microphone boom | 14 crossbar |
|---|---|---|
| 16 cable | 18 microphone | 20 speaker housing |
| 22 lower extension | 24 upper extension | 26 ear tab |
| 28 sliding housing | 30 body part | 32 arm |
| 34 knob | 36 padded covering | 38 speaker |
| 40 speaker hole | 42 trough | 44 head of user |
| 46 pinna | 48 cusp | 50 swale |
| 52 spring | 54 end block | 56 holder |
| 58 roller | 60 axle | 62 body |
| 64 clamping assembly | 66 upper extension | 68 arm |
| 70 knob | 72 inner slot | 74 outer slot |
| 76 sliding body | 78 end portion | 80 post |
| 82 opening | 84 leaf spring | 86 roller |
| 88 axle | 90 axle socket | 92 wire guide |
| 94 sliding body | 96 upper body extension | 98 tension spring |
| 100 post | 102 eyelet | 104 recess |
| 106 flat spring | 108 pawl | 110 notch |
| 112 compression spring | 114 compartment | 116 common wall |

DESCRIPTION—FIGS. A & 1B—SET WITH CAM-POSITIONING THROUGH

The embodiment of the invention illustrated in FIGS. 1A to 1E is a combined handset and headset which can clamp onto the user's pinna for use as a headset and which can extend itself so as to allow its clamping part to be free of the pinna so that is can also be used as a handset.

Figure 1A:
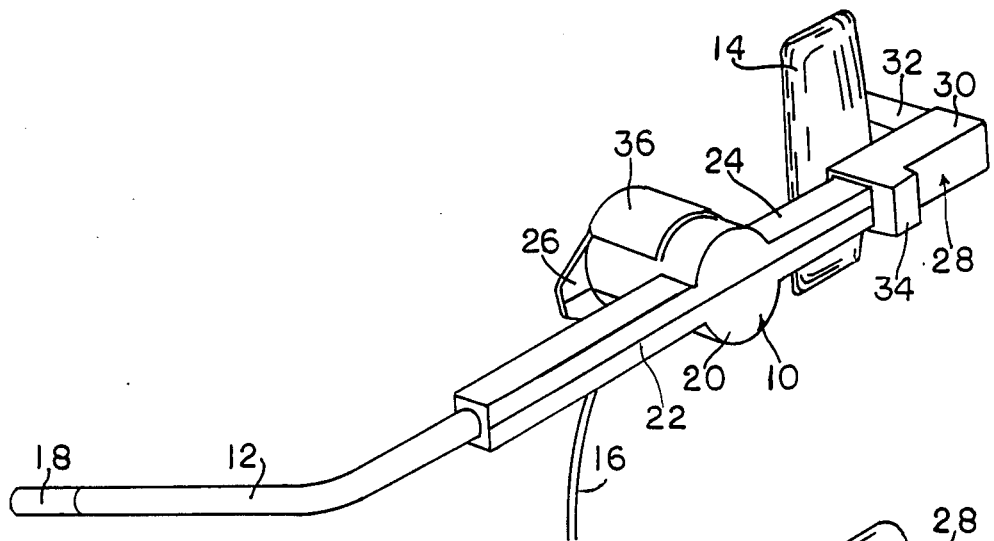
FIGS. 1A and 1B are isometric views of the outer and inner sides, respectively, of a combined handset and headset with a cam-positioning trough according to one embodiment of the invention.
Figure 1B:
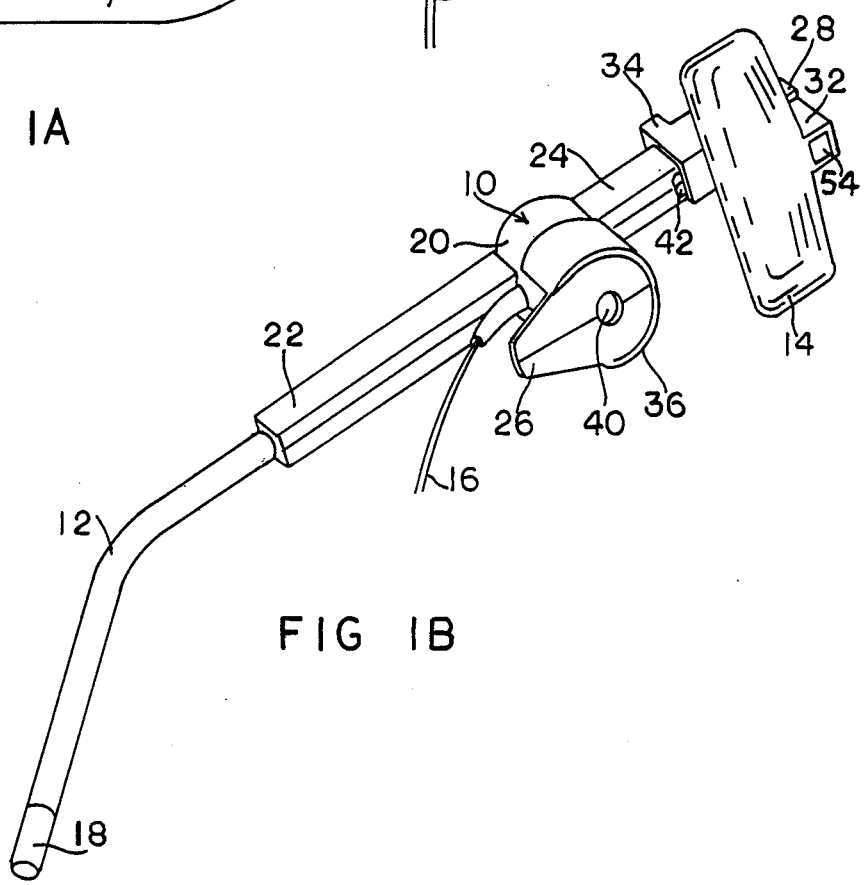

As shown in FIGS. 1A and 1B, the set has, as its principal parts, a telescoping body 10, a microphone boom 12 which extends from the left end of body 10, a crossbar or behind-the-pinna clamping member 14, and an electrical connecting cable 16.

Boom 12 comprises a bent tube with a microphone 18 at its distal end. Boom is conventional and is shaped such that microphone 18 will be in front of or near the user's mouth when the set is worn on or held against a user's ear. A directional microphone with high sensitivity may be used for microphone 18 since it will remain stably in front of the user's mouth when worn as a headset. The length and shape of boom 12 are well known in the art.

Body 10 comprises a main cylindrical speaker housing 20, a lower extension 22 of square cross section which extends integrally from the lower side of housing 20, an upper extension 24 which extends integrally from the upper side of housing 20, and an ear tab 26 at one end of housing 20.

An end housing 28 is mated with upper extension 24 such that extension 24 telescopes into end housing 28. End housing 28 is generally L-shaped with a body part 30 and an orthogonal arm 32. A rectangular finger hold 34 extends out from the side at the lower end of body part 30 and crossbar 14 is attached to the distal end of arm 32. Arm 32 is hollow but contains an end block 54 to be described infra.

All parts preferably are made of hollow hard plastic (see exploded view of FIG. 1E), such as ABS, polycarbonate, or nylon, except for cord 16, and a soft padded covering 36 which extends around ⅔ around the cylinder of housing 20.

Tab 26 prevents housing 20 from entering the ear canal (not shown) and is integral with housing 20 (see FIGS. 1C and 1D). Housing 20 contains a speaker 38 (FIG. 1E—not shown in FIG. 1A or 1B) which supplies sound via a speaker hole 40 in tab 26 of housing 20.

Upper extension 24 includes a trough or slot 42 with a curved bottom which acts as a positioning cam. Only part of trough 42 is shown in FIG. 1B. In accordance with the invention, end housing 28 slides telescopingly on upper extension 24 and is urged by the camming surface in the bottom of trough 42 to either of two discrete positions. These positions are (1) extended as shown in FIGS. 1A and 1B where the device can be used as a handset, and (2) compacted as shown in FIG. 1D where the device is used as a headset, as will now be described.

DESCRIPTION—FIGS. 1C & 1D

The set is shown in partial cross section position on and against the body of a user as both a handset and a headset in FIGS. 1C and 1D, respectively. In both of these FIGS., the set is positioned against a head 44 of a user, specifically with speaker housing 20 and tab 26 in pinna 46 of the user. In FIG. 1C, end housing 28 is extended away from housing 20 so that crossbar 14 clears pinna 46. In FIG. 1D, end housing 28 is compacted close to housing 20 so that crossbar 14 fits into the space behind pinna 46 so as to clamp the pinna between crossbar 14 and housing 20.

As shown in FIGS. 1C and 1D, the bottom of trough 42 is curved so that it has a cusp or crest 48 at its center and two depressions or swales 50i (inner) and 50o (outer) adjacent each end of the trough and on each side of cusp 48. Thus the bottom of trough 42 ramps down from cusp 48 in opposite directions to swales 50i and 50o, respectively.

Arm 32 contains a compression spring 52 which is partially compressed and positioned between an end block 54 and a holder 56 which holds a cam follower roller 58. In FIG. 1C roller 58 is positioned in swale 50o and end housing 28 is at its extended position, while in FIG. 1D roller 58 is positioned on the downward ramp from cusp 48 to swale 50i. In the latter position (FIG. 1D), the ramp and spring 52 cooperate to urge roller 58, and hence entire end housing 28, to main housing 20, as indicated by the arrow. End housing 28 cannot reach its fully compacted position where roller 58 rests in swale 50i because of pinna 46, which it clamps in cooperation with housing 20. Thus end housing 28 has two discrete, stable end positions as it telescopes on upper extension 24: extended where roller 58 rests in swale 50o and compacted where roller 58 rest in swale 50i. In any intermediate position, the position of housing 28 will be unstable, i.e., the camming surface in trough 42 will urge the housing to either end position.

As also in FIGS. 1C and 1D, cable 16 contains four individual wires which lead into boom 12 and then to microphone 18 (not shown in these FIGS.) and to speaker 38 which is positioned in main housing 20. Note also that in FIG. 1D, pinna 46 is clamped between two portions: soft covering 36 of housing 20 and rigid crossbar 14.

DESCRIPTION—FIG. 1E

Figure 1E:
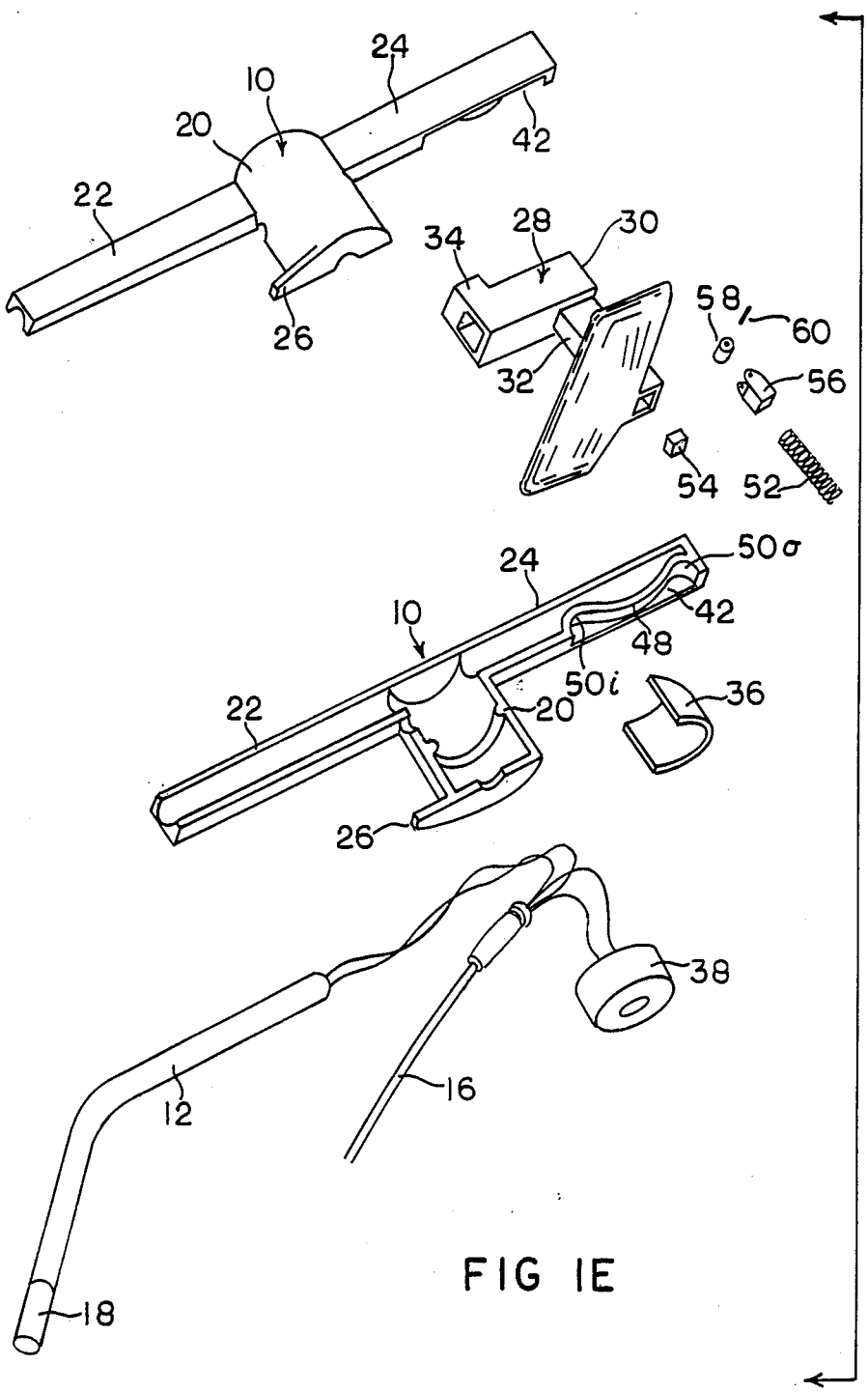
FIG. 1E is an exploded view of the set of FIG. 1A.

FIG. 1E illustrates all of the parts of the set in detail in exploded format. Note that body 10 with its bottom and top extensions 22 and 24 is formed of two shell-like halves; these can be cemented, ultrasonically welded, screwed, or latched together (screws and latching tabs not shown). The bottom positioning cam surface of trough 42 is formed of two halves, one on each half of the main body. The fabricator then telescopingly assembles end housing 28 to upper extension 24 and then assembles spring 52, roller 58, its holder 56, its rotational axle 60, and end block 54, which the assembler fixes in arm 32 by cement or force fit. The assembler then cements covering 36 to housing 20 and boom 12. Captivating flanges (not shown) or a force fit holds speaker 38. Body 10 preferably is about 105 mm long, crossbar 14 is about 51 mm wide, trough 42 is about 22 m long, and the other parts have proportional dimensions.

OPERATION—FIGS. 1C & 1D

The operation of the set may be easily understood by returning to FIGS. 1C and 1D.

If it is to be used as a handset, and the set is delivered in its compacted position (FIG. 1D), end housing 28 is simply pulled back to the position shown in FIG. 1C, using knob 34. It will lock in this position because roller 58 will rest in outer swale 50o with spring 52 maximally extended so that it stores minimum energy. When the user then picks up the set and positions it against an ear (either ear can be used), crossbar 14 will not interfere with the pinna because of its relatively great distance from speaker housing 20. Thus the set can be positioned easily against the head so that housing 20 is in the pinna, and it can easily be removed from the ear without crossbar 14 contacting or interfering with the pinna. The square shape of lower extension 22 enables the user to grip it more securely than if it were circular.

If the user desires to use the set as a headset, he or she positions it against the head as in FIG. 1C and the pulls end housing 28 toward housing 20, using knob 34. At first the user will feel some resistance as roller 58 rides up the ramp between swale 50o and cusp 48, compressing spring 52, but then as the roller rides over the cusp, the resistance will diminish. As soon as the roller begins to ride on the downward ramp to swale 50i, spring 52 will release some of its energy and, in cooperation with the ramp, will urge housing 28 toward housing 20 until crossbar 14 meets the back of the pinna, as shown in FIG. 1D. In this position the set will grip or clamp onto the pinna and the set will thus be held firmly to the head in a fixed position. The user can thus talk hands free and even can move about, according to the length of cable 16.

To remove the set from the head, the user simply pulls extension 22 forward, causing trough 42 to slide forward with respect to roller 58 until housing 28 locks in its extended or handset position (FIG. 1C). The set can then easily be removed from the head, as described above in conjunction with FIG. 1C. The set will normally remain in its extended position (FIG. 1C) so that when it is to be used again, it is simply picked up, placed against the ear and either used in this condition as a handset, or placed in its compacted position using knob 34 for use as a headset.

Note that the set is self-adjusting, no matter what the size of the user's pinna. This is because the length of the ramp between cusp 48 and swale 50i is made long enough to accommodate a wide range of pinna sizes.

DESCRIPTION—FIGS. 2A TO 2D—SET WITH BOWED SPRING POSITIONER

The set of FIGS. 2A and 2B operates similarly to the set of FIGS. 1, but uses a different positioning mechanism to maintain its extended and contracted positions.

The set comprises, as its main parts, a body 62, boom 12 which is identical to that of FIG. 1A, and a movable clamping assembly 64. Body 62 comprises a lower extension 22 which is identical to that of FIG. 1A, a cylindrical speaker housing 20 which is identical to that of FIG. 1A, and an upper extension 66. As indicated supra, housing 20 has a cylindrical shape with a padded covering 36 and an ear tab 26. Clamping assembly 64 comprises crossbar 14 which is identical to that of FIG. 1A, an arm 68, and a finger hold or knob 70 which is attached to arm 68. Knob 70 extends into upper extension 66 via an outer slot 74 and arm 68 extends into extension 66 via an inner slot 72. As before, cable 16 supplies suitable audio signals to the set.

Figure 2C:
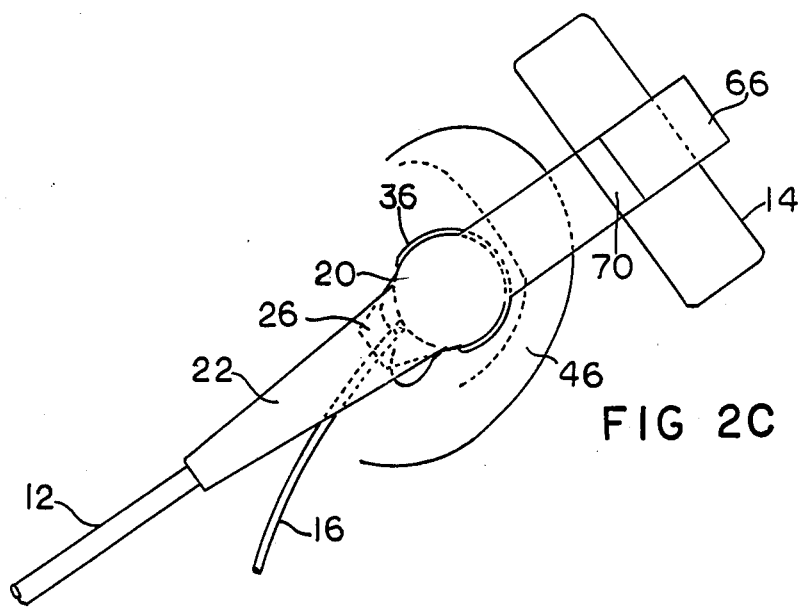
FIGS. 2C and 2D are side, outer-side views of the set of FIG. 2A in handset and headset positions.

If not already in its extended position, the set is put into its handset or extended position by pulling assembly 64 away from housing 20 to its extended position, as shown in FIGS. 2A, 2B, and 2C. Here the set is expanded and crossbar 14 is widely spaced from housing 20 so that it can be used as a handset without crossbar 14 interfering with the pinna, as described before and as shown clearly in the side view of FIG. 2C.

Figure 2D:
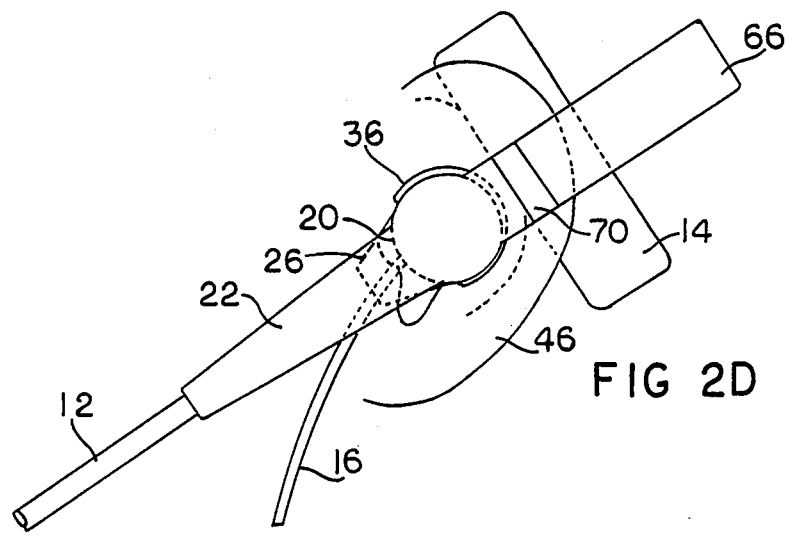
Figure 2E:
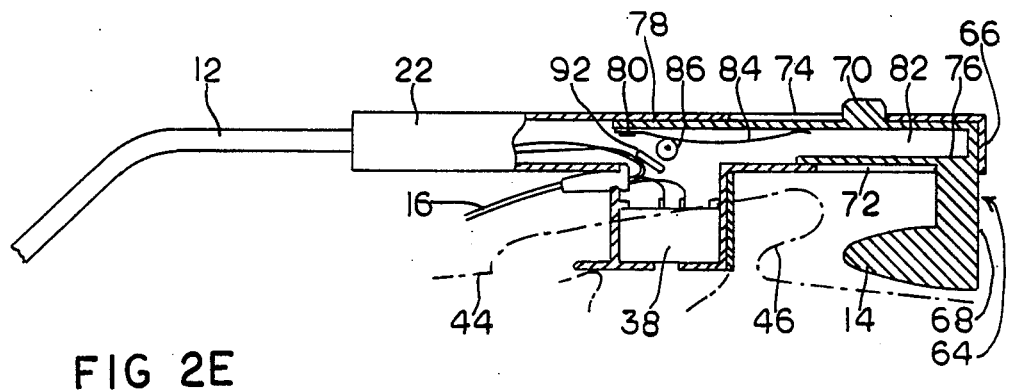
FIGS. 2E and 2F are partial sectional views of the set of FIG. 2A in a handset and headset positions.
Figure 2F:
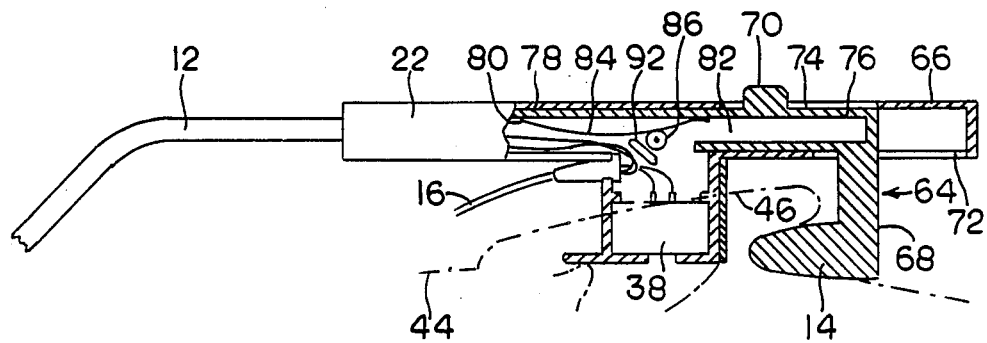

To put the set into its headset or compacted position, the user first positions it on the head as shown in FIG. 2C and then pulls knob 70 toward housing 20, to the position shown in FIGS. 2D and 2F. Here the set is compacted and crossbar 14 is relatively closely spaced from housing 20 so that it clamps the user's pinna between housing 20 and crossbar 14, as before. Here the set will retain itself on the user's head to provide hands-free telephone usage.

DESCRIPTION AND OPERATION—FIGS 2E TO 2G

Figure 2G:
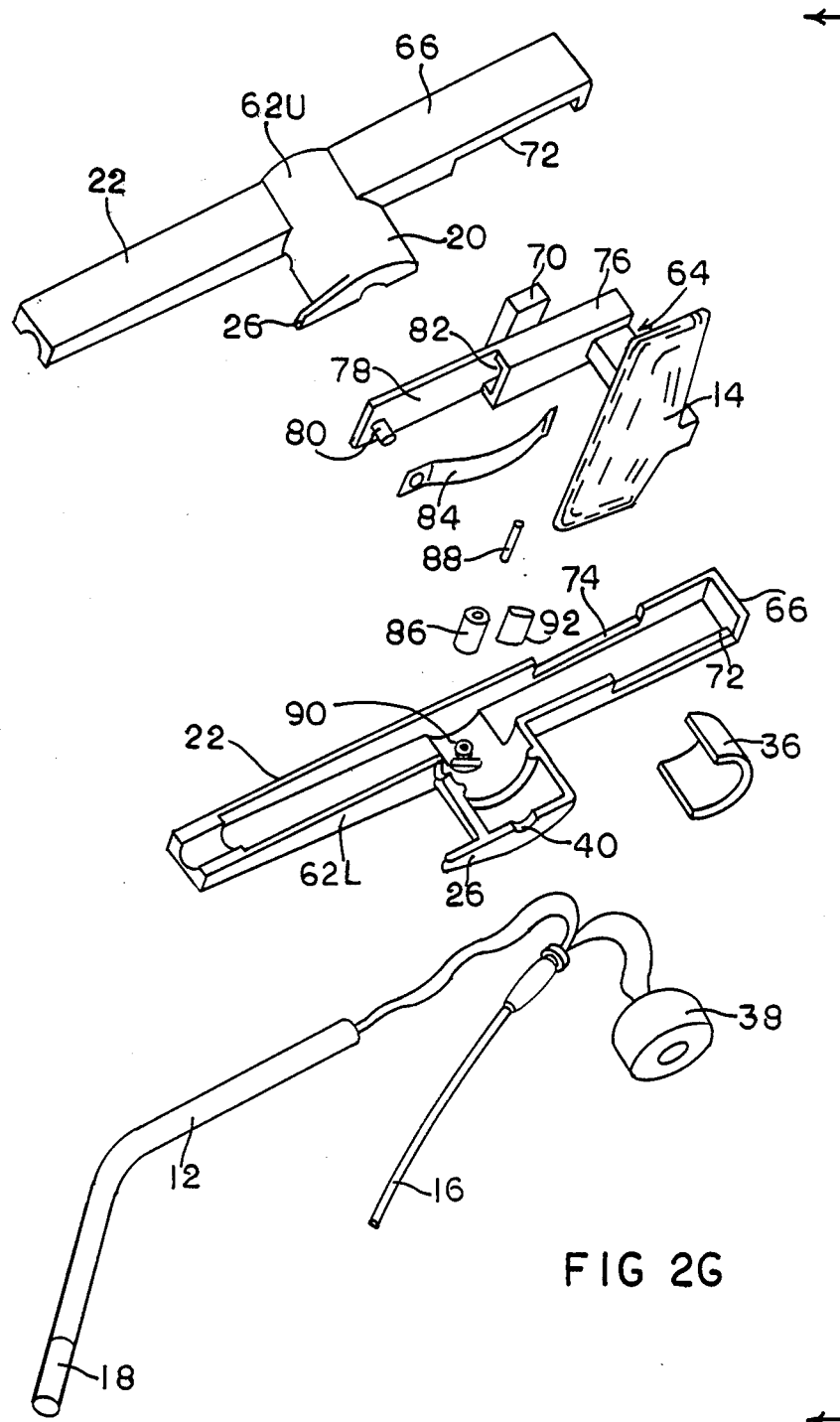
FIG. 2G is an exploded view of the set of FIG. 2A.

The internal mechanism of the set of FIGS. 2 is illustrated in FIGS. 2E to 2G. It uses a bowed leaf spring positioning mechanism in lieu of the curved trough bottom camming mechanism of FIGS. 1.

Movable clamping assembly 64 comprises arm 68, crossbar 14, and knob 70, as stated. Inside upper extension 66 of the main assembly is a sliding body 76 which is integral to and forms an L-shaped assembly with arm 68. As best seen in FIG. 2G, the middle of body 76 is attached to knob 70 and it has a narrowed end portion 78 which has a post 80 orthogonally attached thereto. The thicker part of body 76 is hollow and has an opening 82 adjacent end portion 78. A bowed leaf spring 84 has a hole on one end which is positioned over post 80; its other end extends into opening 82 holds the spring securely.

As shown in FIG. 2G, housing 62 is formed of two shell-like halves, upper half 62U and lower half 62L. A roller 86 is rotatably mounted inside housing 20 in a position where it will ride over spring 84 when clamping assembly 64 is moved between its two stable positions. Roller 86 is mounted on an axle 88 which extends into respective axle sockets. One axle socket is shown at 90 and is attached to lower half 62L and the other socket (not shown) is similarly mounted in upper half 62U. A wire guide 92 is also mounted in body 62 near roller 86; it purpose is to dress the wires coming out of cable 16 away from roller, 86, as shown in FIGS. 2E and 2F.

Roller 86 is thus fixed in position in body 62, but can rotate on its axis. Thus when the user pulls clamping assembly 64 out, as indicated in FIGS. 2A, 2B, 2C, and 2E, roller 86 will rest against spring 84, near its left end as seen in FIG. 2E. In this position spring 84 still pushes roller 86 to the left so as to also push assembly 64 outwardly by an opposing reaction. Outward travel of assembly 64 is limited by knob 70 contacting the right end of slot 74.

When the user pulls clamping assembly 64 in, to the position indicated in FIGS. 2D and 2F, this will push spring 84 under roller 86 so that the final position of roller 86 is near the spring's right end, as shown in FIG. 2F. When the user moves assembly 64 between its extended position (FIG. 2E) to its compacted position (FIG. 2F), this will first cause roller 86 to ride up the spring to its center or crest, encountering resistance, and then down the spring, from its crest to its right end, where the spring will push assembly 64 inwardly. Inward travel of assembly 64 will be limited by crossbar 14 contacting pinna 46.

The set of FIG. 2G is assembled in a manner similar to that of FIG. 1E, except that the different components in the set of FIG. 1G are assembled specially.

DESCRIPTION AND OPERATION—FIGS. 3 AND 4

In the sets of FIGS. 3 and 4 (shown in section in partial views only) two springs are used to pull in and position the moveable clamping extension.

The set of FIG. 3 includes a moveable or slidable body 94 with a crossbar 14. Body 94, generally similar to that of FIGS. 2, rides in an upper body extension 96 which has a slot 72, similar to that of FIGS. 2. A tension spring 98 is mounted inside extension 96. The left end of spring 98 is fixed to a post 100 which is in turn fixed to an inside wall of the extension. The right end of spring 98 is attached to an eyelet 102 on body 94. Thus spring 98 will constantly pull body 94 to the left, to its compacted position.

Body 94 contains a recess or cutout 104, in which is mounted a cantilevered flat spring 106 which has a bight end 108 which forms a detent or pawl. The inner wall of upper extension 96 contains a recess or notch 110. Pawl 108 mates with notch 110 when body 94 is pulled out to its extended position as shown. The strength of spring 106, the height of pawl 108, and the depth of notch 110 are selected such that when pawl 108 fits into notch 110, spring 98 will not be able to pull body 94 back. Thus the set will remain stably in the position shown.

If the user pulls body 94 back with sufficient force (when combined with the force of spring 98) to pull pawl 108 out of notch 110, spring 98 will then take over and pull body 94 inward so that body 94 will travel toward its compacted position, until crossbar 14 meets the pinna or body 94 meets the end of slot 72, similar to that shown in FIG. 2D. When pawl 108 is pulled out of notch 110, and body 94 proceeds inwardly, pawl 94 will slide against the inner wall of extension 96, to the left of notch 110.

The set of FIG. 4 is constructed and operates similarly to that of FIG. 3, except that a compression spring 112 is positioned in a recess 104' in sliding body 94', between a shoulder of body 94' and the end wall of upper extension 96. Spring 112 constantly pushes body 94' inwardly or to the left. As in FIG. 3, flat spring 106 has an end pawl 108 which holds body 94' in extended position, but when enough inward force is applied to body 94', it will push pawl 108 out of notch 110, allowing spring 112 to push body 94' toward its compacted position.

DESCRIPTION AND OPERATION—FIG. 5

FIG. 5 is a partial view, in cross section, of a set with a moveable extension and crossbar according to a fifth embodiment of the invention. Many of the components in the set of FIG. 5 are identical to those of the previous embodiments and have the same reference numbers. Those components which are similar to those of the previous embodiments have the same, but primed, reference numerals. New components which do not correspond to those of the previous embodiments have new reference numerals.

A modified speaker housing 20' has, in addition to speaker 38, coil spring 52, holder 56, roller 58, and end block 54. The last four components are mounted in a separate elongated compartment 114 which is on the side of housing 20'. When seen from an axial or cross-sectional view, housing 20' has a main section with a circular shape similar to that of housing 20 of FIG. 1, and adjacent side section 114, also with a circular, but much smaller shape. The two circular sections thus resemble a figure "8", albeit with loops of greatly different diameters. Tab 26 (FIG. 1) is omitted.

Housing 20' is connected to a hollow lower extension 22' which is similar to extension 22 of FIG. 1C in that is holds boom 12 at its left end and is rectangular in cross section. However in lieu of having a large open connection with housing 20 as in FIG. 1C, the main section of housing 20' is closed by a common wall section 116, but side section 114 is open so that holder 56 and roller 58 can protrude into extension 22'.

Positioned in or telescopingly mated with housing 20' and extension 22' is a moveable upper extension 24' which has a cusp 48' and swales 50o' and 50i' spaced in from its left side, a crossbar 14 connected to its right end by an arm 32', and a knob 34 positioned in from its right end. Extension 24' is shown in its extended, stable position where roller 58 rests in swale 50o' and crossbar 14 is relatively distant from housing 20'. In this position, the set can be positioned on the pinna without interference. Once so positioned, extension 24' can be pushed in toward housing 20' so that spring 52 will press roller 58 against the ramp between cusp 48' and swale 50i'. In this position, the force from roller 58 will have a component which will urge crossbar 14 toward housing 20' so as to clamp the pinna (not shown in FIG. 5) as before.

This embodiment thus operates similarly to the other embodiments except for the fact that the upper extension and the crossbar are fixed together and move as a unit with respect to the housing and the lower extension, rather than the crossbar moving with respect to the upper extension. Cable 16 and its junction with housing 20' is not shown, but the cable can be mechanically joined to the outside of housing 20' and its wires routed to boom 12 and speaker 38 via holes (not shown) in housing 20' and extension 22' near boom 12.

SUMMARY, RAMIFICATIONS, AND SCOPE

Accordingly the reader will see that I have provided a combined handset and headset. It can be used without impediment as a handset, and can be converted to a headset in a convenient manner. It can be used on either the left or right ear without any adjustment, it is relatively simple, rugged, stable in the ear, and can be used by multiple users without any adjustment, regardless of their pinna sizes. Further it can be used with highly directive microphones without the need for frequent repositioning and it can be easily installed on or removed from the ear.

While the above description contains many specificities, these should not be construed as limitations on the scope of the invention, but as exemplifications of the presently-preferred embodiments thereof. Many other ramifications and variations are possible within the teachings of the invention. For example, the dimensions, materials, and shapes of components can be varied. The microphone can be omitted, in which case the device would simply be a self-retaining earset. Other forms of spring compacting and locking or position-retaining means can be used, such as spring-loaded semi-spherical pawls and mating notches, elastic bands, a sliding frictional fit (no detents), etc. The positions of the bowed spring or camming trough and the roller can be interchanged. The speaker can be placed elsewhere than in housing 20, e.g., in the upper extension, and can be connected to supply sound to speaker hole 40 via a sound tube inside body 10. Crossbar 14 can be crescent shaped, and/or it can be made of resilient materials. In lieu of being connected perpendicularly to a line or axis running between the inner and outer ends of the speaker housing, the upper extension can be connected at other angles, or at locations on the outer housing other than the outer end thereof.

Thus the reader is requested to determine the scope of the invention by the appended claims and their legal equivalents, and not by the examples given.

I claim:

1. A self-retaining earset, comprising:
   a housing shaped to fit in the pinna of an ear adjacent the auditory canal, said housing having an inner end which will be positioned adjacent the auditory canal when said housing is positioned in said pinna so that said inner end can supply sound to said auditory canal, said housing having an outer end which extends out of said pinna when said housing is positioned in said pinna,
   an extensions joined to said housing and extending therefrom in a direction generally perpendicular to the direction between said inner and outer ends of said housing, and
   clamping means comprising a clamping member which is shaped and attached to said extension such that:
      said clamping member can be moved along said extension in a linear fashion from a compacted position relatively close to said housing to an extended position relatively distant from said housing,
      when said clamping member is in its compacted position relatively close to said housing, and when said housing is positioned in said pinna, said clamping member will be positioned behind said pinna so that said pinna will be positioned between said clamping member and said housing, and
      when said clamping member is in its extended position relatively distant from said housing and when said housing is positioned in said pinna, said clamping member will be positioned away from said pinna so that said housing can be withdrawn from said pinna without said clamping member interfering with said pinna, and
      when said housing is away from said pinna, said housing can be positioned in said pinna without said clamping member interfering with said pinna.

2. The earset of claim 1, further including positioning means for either locking said clamping member in its extended position or urging said clamping member toward said housing when it is not in said extended position.

3. The earset of claim 2 wherein said positioning means is arranged to urge said clamping member toward said housing only when said clamping member is moved to a position spaced from its extended position by a predetermined distance.

4. The earset of claim 2 wherein said positioning means comprises a trough, said trough having a cam-positioning surface with a crest and two swales on the sides of said crest, respectively, and a spring-loaded cam follower positioned to slide along said cam-positioning surface.

5. The earset of claim 4 wherein said trough is in said extension and said cam follower is attached to move with said clamping member.

6. The earset of claim 2 wherein said positioning means comprises a bowed lear spring and a post positioned to ride over said leaf spring as said clamping member is moved from its extended position to its compacted position.

7. The earset of claim 6 wherein said bowed leaf spring is attached to and moves with said clamping member and said post is fixed to said housing.

8. The earset of claim 2 wherein said positioning means comprises a linear surface having a notch therein, a cantilevered spring having a pawl at the end thereof, said pawl positioned to mate with said notch when said clamping member is moved to its extended position, and an expandable spring urging said clamping member to its compacted position.

9. The earset of claim 8 wherein said linear surface with said notch therein is fixed to said extension and said cantilevered spring is attached to and moves with said clamping member.

10. The earset of claim 8 wherein said expandable spring is a tension spring connected between said extension and said clamping member.

11. The earset of claim 8 wherein said expandable spring is a compression spring positioned between said extension and said clamping member.

12. The earset of claim 1 wherein said clamping member comprises a crossbar extending substantially perpendicular to said direction between said inner and outer ends of said housing and an arm connecting said crossbar to said extension.

13. The earset of claim 1 wherein said extension and said clamping member are telescopingly mated.

14. The earset of claim 1 wherein said clamping member comprises a crossbar extending in a direction substantially perpendicular to said direction and an arm having one end connected to said crossbar, said arm being parallel to said direction, and a sliding housing telescopingly mated with said extension, the other end of said arm being connected to said housing.

15. The earset of claim 1 wherein said clamping member comprises a crossbar extending perpendicular to said direction, a sliding member positioned inside said extension, and an arm connecting said sliding member to said crossbar through a slot in said extension.

16. The earset of claim 1, further including a microphone boom with a microphone attached to a distal end of said boom, the proximal end of said boom being attached to said housing via a rectangular housing portion, and a speaker in said housing.

17. A self-retaining earset, comprising:
a housing containing a speaker, said housing shaped to fit in the pinna of an ear adjacent the auditory canal, said housing having an inner end which will be positioned adjacent the auditory canal when said housing is positioned in said pinna so that said speaker can supply sound to said auditory canal, said housing having an outer end which extends out of said pinna when said housing is positioned in said pinna,
an extension joined to said outer end of said housing and extending therefrom in a direction generally perpendicular to a line extending from said outer end to said inner end of said housing,
clamping means comprising a clamping member which is shaped and slidably attached to said extension such that:
said clamping member can be moved along said extension in a linear fashion from a compacted position relatively close to said housing to an extended position relatively distant from said housing,
when said clamping member is in its compacted position relatively close to said housing, and when said housing is positioned in said pinna, said clamping member will be positioned behind said pinna so that said pinna will be positioned between said clamping member and said housing,
when said clamping member is in its extended position relatively distant from said housing and when said housing is positioned in said pinna, said clamping member will be positioned away from said pinna so that said housing can be withdrawn from said pinna without said clamping member interfering with said pinna, and
when said housing is away from said pinna, said housing can be positioned in said pinna without said clamping member interfering with said pinna, and
positioning means for either locking said clamping member in its extended position or urging said clamping member toward said housing when it is not in said extended position, said positioning means being arranged to urge said clamping member toward said housing only when said clamping member is moved to a position spaced from its extended position by a predetermined distance, said positioning means comprising a trough, said trough having a cam-positioning surface with a crest and two swales on the sides of said crest, respectively, and a spring-loaded cam follower positioned to slide along said cam-positioning surface.

18. The earset of claim 17 wherein said clamping member comprises a crossbar extending perpendicular to said line and an arm connecting said crossbar to said extension.

19. A self-retaining earset, comprising:
a housing containing a speaker, said housing shaped to fit in the pinna of an ear adjacent the auditory canal, said housing having an inner end which will be positioned adjacent to auditory canal when said housing is positioned in said pinna so that said speaker can supply sound to said auditory canal, said housing having an outer end which extends out of said pinna when said housing is positioned in said pinna, the direction between said inner end of said housing and said outer end of said housing being a first direction,
an extension joined to said outer end of said housing and extending therefrom in a second direction generally perpendicular to said first direction,
clamping means comprising a clamping member which is shaped and attached to said extension such that:
said clamping member can be moved along said extension in a linear fashion from a compacted position relatively close to said housing to an extended position relatively distant from said housing,
when said clamping member is in its compacted position relatively close to said housing, and when said housing is positioned in said pinna, said clamping member will be positioned behind said pinna so that said pinna will be positioned between said clamping member and said housing,
when said clamping member is in its extended position relatively distant from said housing and when said housing is positioned in said pinna, said clamping member will be positioned away from said pinna so that said housing can be withdrawn from said pinna without said clamping member interfering with said pinna, and
when said housing is away from said pinna, said housing can be positioned in said pinna without said clamping member interfering with said pinna, and
positioning means for either locking said clamping member in its extended position or urging said clamping member toward said housing when it is not in said extended position, said positioning means being arranged to urge said clamping member toward said housing only when said clamping member is moved to a position spaced from its extended position by a predetermined distance, said positioning means comprising a bowed leaf spring and a post positioned to ride over said leaf spring as said clamping meber is moved from its extended position to its compacted position.

20. The earset of claim 19 wherein said clamping member comprises a crossbar extending perpendicular to said first direction and an arm connecting said crossbar to said extension.

21. A self-retaining earset, comprising:
(A) a housing shaped to fit in the pinna of an ear adjacent the auditory canal, said housing having an inner end which will be positioned adjacent the auditory canal when said housing is positioned in said pinna so that said inner end can supply sound to said auditory canal, said housing also having an outer end which extends out of said pinna when said housing is positioned in said pinna, and
(B) clamping means comprising a clamping member and an upper extension which is coupled to said housing such that:
  (1) said clamping member can be moved with said upper extension in a linear fashion from a compacted position relatively close to said housing to an extended position relatively distant from said housing,
  (2) when said clamping member is in its compacted position relatively close to said housing, and when said housing is positioned in said pinna, said clamping member will be positioned behind said pinna so that said pinna will be positioned between said clamping member and said housing, and
  (3) when said clamping member is in its extended position which is relatively distant from said housing and
    (a) when said housing is positioned in said pinna, said clamping member will be positioned away from said pinna so that said housing can be withdrawn from said pinna without said clamping member interfering with said pinna, and
    (b) when said housing is away from said pinna, said housing can then be moved to said position in said pinna without said clamping member interfering with said pinna.

22. The earset of claim 21 further including a lower extension coupled to said housing and extending therefrom in a direction generally perpendicular to the directin between said inner and outer ends of said housing, and wherein said upper extension is telescopingly mated with said lower extension.

23. The earset of claim 22, further including positioning means for locking said clamping member in its extended position and urging said clamping member toward said housing when said clamping member is not in said extended position.

24. The earset of claim 23 wherein said positioning means comprises a trough, said trough having a cam-positioning surface with a crest and two swales on the sides of said crest, respectively, and a spring-loaded cam follower positioned to slide along said cam-positioning surface.

25. The earset of claim 24 wherein said trough is part of and attached to said upper extension and said cam follower is attached to said housing means.

26. A combination headset-handset apparatus, comprising:
(A) a housing shaped to fit in the pinna of an ear adjacent the auditory canal, said housing having an inner end which will be positioned adjacent the auditory canal when said housing is positioned in said pinna so that said inner end can supply sound to said auditory canal, said housing having an outer end which extends out of said pinna when said housing is positioned in said pinna,
(B) an extension joined to said housing and extending therefrom in a direction generally perpendicular to the direction between said inner and outer ends of said housing,
(C) clamping means comprising a clamping member which is shaped and attached to said extension such that:
  said clamping member can be moved in a linear fashion with respect to said housing from a compacted position relatively close to said housing to an extended position reltively distant from said housing,
  when said clamping member is in its compacted position relatively close to said housing, and when said housing is positioned in said pinna, said clamping member will be positioned behind said pinna so that said pinna will be positioned between said clamping member and said housing, and
  when said clamping member is in its extended position relatively distant from said housing, and
  when said housing is positioned in said pinna, said clamping member will be positioned away from said pinna so that said housing can be withdrawn from said pinna without said clamping member interfering with said pinna, and
  when said housing is away from said pinna, said housing can then be moved to said position in said pinna without said clamping member interfering with said pinna, and
(D) a boom connected to said housing, whereby said apparatus may be used as a handset and a headset.

* * * * *

UNITED STATES PATENT AND TRADEMARK OFFICE
CERTIFICATE OF CORRECTION

PATENT NO. : 4,932,052

DATED : Jun. 5, 1990

INVENTOR(S) : Lo, Jack

It is certified that error appears in the above-identified patent and that said Letters Patent is hereby corrected as shown below:

Col. 5, l. 43, change "m" to --mm--.

Col. 10, l. 3, change "extensions" to --extension--.

Col. 13, l. 9, change "meber" to --member--.

Signed and Sealed this

Eleventh Day of June, 1991

Attest:

HARRY F. MANBECK, JR.

Attesting Officer     Commissioner of Patents and Trademarks